Figure 4:
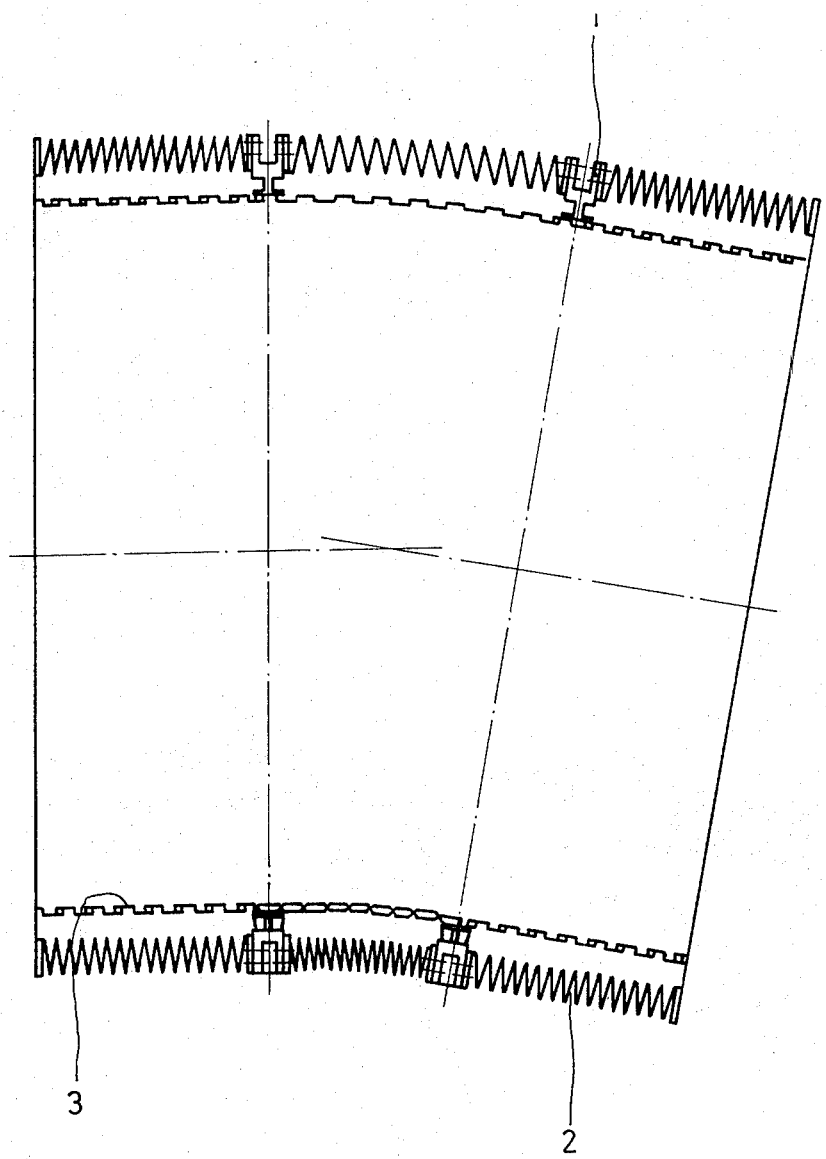

United States Patent
Weigmann

[11] 3,759,447
[45] Sept. 18, 1973

[54] FLEXIBLE TUBING FOR THE CONDUCTING OF HOT JET ENGINE GASES

[75] Inventor: Erich W. Weigmann, Munchen, Germany

[73] Assignee: Messerschmitt-Bolkow-Blohm GmbH, Munich, Germany

[22] Filed: May 28, 1971

[21] Appl. No.: 148,010

[30] Foreign Application Priority Data
June 8, 1970 Germany.................. P 20 28 067.5

[52] U.S. Cl......... 239/265.35, 239/265.43, 239/588
[51] Int. Cl. ............................................. B64c 15/04
[58] Field of Search................ 239/265.11, 265.33, 239/265.35, 265.43, 265.19, 602, 591, 587, 239/588; 138/119 T, 120, 138, 139

[56] References Cited
UNITED STATES PATENTS

| | | | |
|---|---|---|---|
| 3,443,758 | 5/1969 | Kopp et al. | 239/588 |
| 2,934,095 | 4/1960 | Lockhart | 138/138 |
| 2,956,248 | 10/1960 | Strand | 138/120 |
| 3,089,520 | 5/1963 | Huet | 138/138 |
| 3,266,059 | 8/1966 | Stelle | 138/120 |
| 3,441,220 | 4/1969 | Wildner | 239/587 |
| 3,482,783 | 12/1969 | Nebiker et al. | 239/265.43 |
| 3,231,037 | 1/1966 | Needham et al. | 239/602 |
| 3,266,244 | 8/1966 | Schulze et al. | 239/265.35 |

FOREIGN PATENTS OR APPLICATIONS

| | | | |
|---|---|---|---|
| 1,121,889 | 1/1962 | Germany | 239/265.43 |
| 797,874 | 7/1958 | Great Britain | 239/265.43 |

Primary Examiner—Lloyd L. King
Attorney—Woodhams, Blanchard & Flynn

[57] ABSTRACT

Flexible conduit for guiding exhaust gases from a jet engine, particularly for aircraft use. Said conduit is intended for attachment to the discharge end of a jet engine for redirecting the flow of propellant gases, as for either braking or attitude control purposes. The conduit in the preferred embodiment comprises a plurality of base rings pivoted to each other on alternately perpendicular axes with a flexible hose of heat-resistant material provided internally of said rings and a protective skin applied externally of said ring. Preferably serially connected hydraulic means are provided between alternately pivoted pairs of rings to provide hydraulic control for pivoting or flexing said conduit as desired.

13 Claims, 5 Drawing Figures

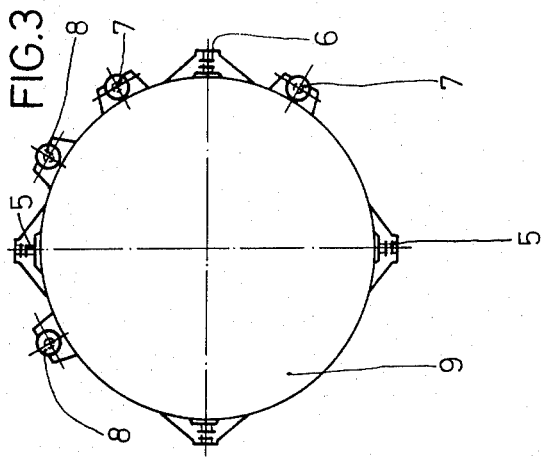
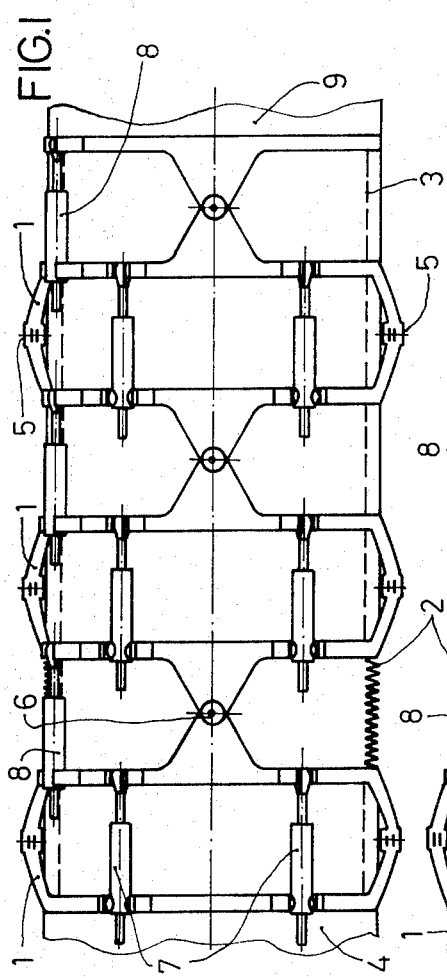
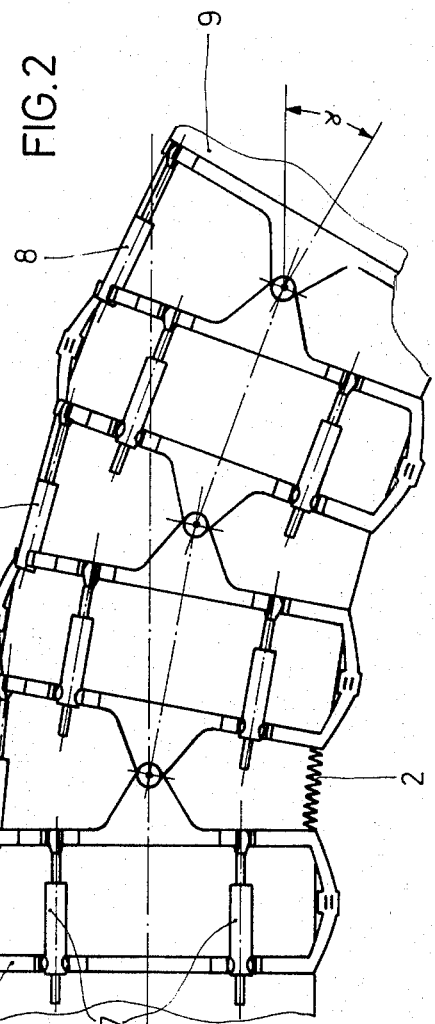

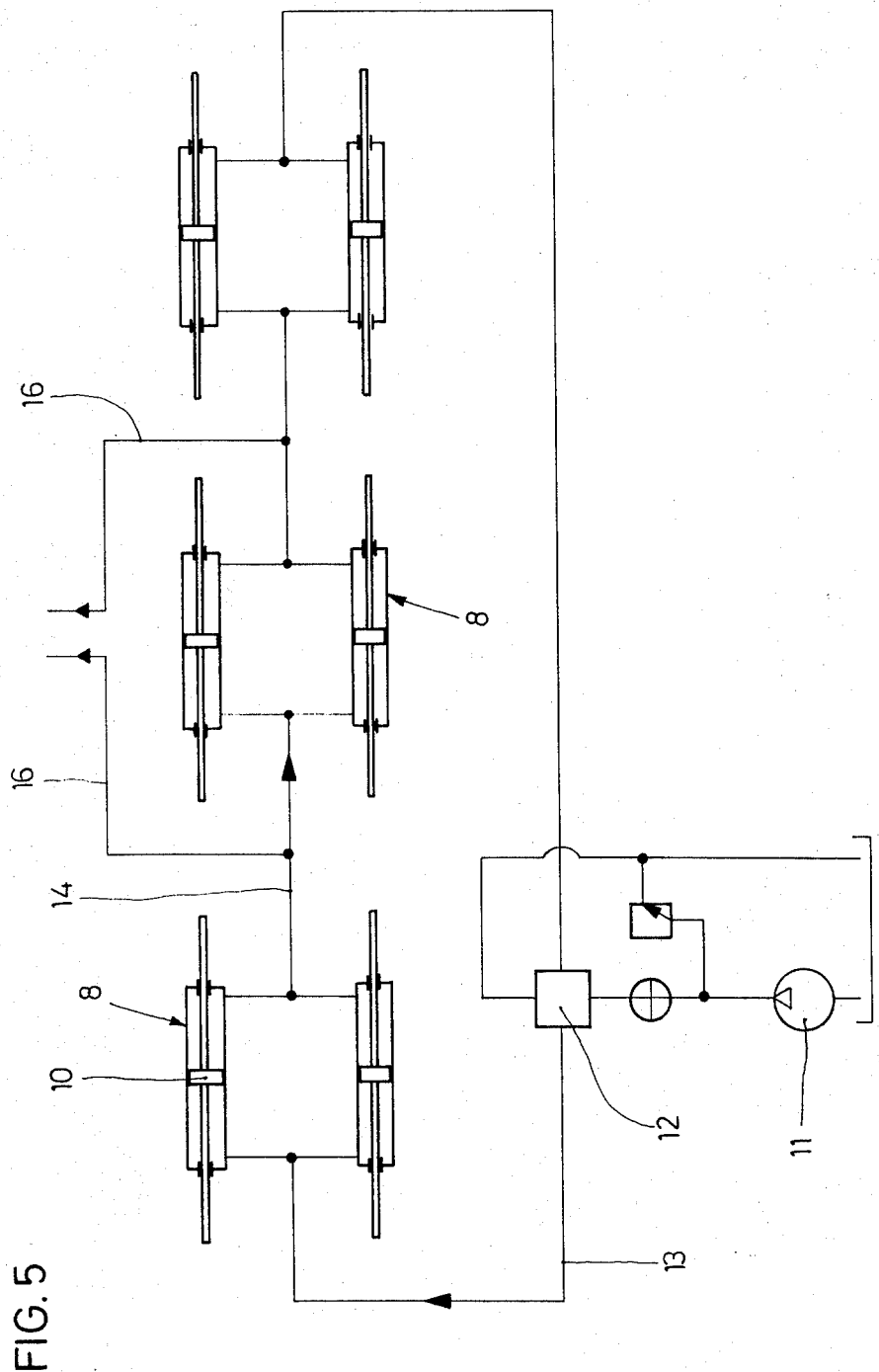

FLEXIBLE TUBING FOR THE CONDUCTING OF HOT JET ENGINE GASES

The invention refers to a flexible conduit for the guiding of hot jet engine gases, said conduit consisting of a series of base rings arranged in sequence in the direction of flow. The conduit is provided with joints in such a manner that successive base rings can be angled with respect to each other. A flexible inner lining supported by the rings is provided on the inside of the conduit and an outer skin surrounds and is supported by said rings.

The function of such flexible conduit or pipes is to redirect the flow of propellant gases generated by the jet engine in directions other than the axial direction of the jet engine. The redirecting, for example, may occur when it is necessary to convert the propellant force of the jet engine gases to a braking force; or to generate in the propellant gases being discharged at the tail of the plane a steering moment which can be utilized for positioning corrections, etc.

Besides numerous other means suggested for dealing with these problems, flexible tubing of the above mentioned type does already exist, whereby each base ring may be pivoted with respect to a preceding ring by means of joints at the side, in such a manner that all such rings, and thus the entire piece of tubing can be moved in one plane, that is the lengthwise symmetrical plane of the jet (DAS 1 238341). An inner lining is provided and consists of conventional sheet metal rings which are connected to the base rings, and which overlap so as to allow for a gas-tight channel of flow for the propellant gas, while maintaining maximum flexibility in the curvature of the conduit. It is obvious that in such a construction a great many base rings and corresponding sheet metal rings must be provided to achieve the continuous pipe-wall necessary to avoid a continuous loss of gases. Such a construction is unsatisfactory due both to its considerable expense and to its cumbersome nature resulting from its excessive weight. Further, this conventional construction permits directing the jet engine gases only in the direction of roll control of the plane.

It is the purpose of this invention to design such a conduit which will provide for a simple loss-free channel, which will use a minimum number of rings and which will provide for directing the jet stream in the direction of both roll control and yaw control.

The purpose of the invention is achieved by allowing the rings, beginning with a first ring which is solidly connected to the jet engine casing, to pivot with respect to the preceding ring, alternately in horizontal and vertical planes and by having the inner lining in the form of a spiral hose made of heat-resistant material. The last ring carries the discharge nozzle. In case of a motion in only one plane, for example, in the lengthwise symmetrical plane of the jet, this method of construction causes only each second pilot ring to perform a pivoting motion with respect to preceding ring and to carry along the immediately subsequent guide ring rigidly in the direction of the motion. However, a variety of motion combinations are also possible as a result of the two specifically provided pivotal motions, whereby all of the rings contribute a portion to the total swiveling motion.

The use of a conventionally flexible spiral hose makes it possible to utilize a relatively small number of rings, because the very nature of the hose allows it to assume a constant curvature even with a minimum of support points. The total required number of rings naturally depends on the required total angle of pivoting. For example, if a total pivoting angle of 30° is required, with respect to each of the pivoting planes, three pivoting rings appear to be sufficient respectively for each pivoting plane, resulting in a total of six individual rings which work together in pairs.

According to one characteristic of the invention, it is intended that each ring is so designed as to enable it to receive both the inner lining and the outer skin. In this manner, the rings stabilize the inner lining and the outer skin in an axial as well as a radial sense, so that self-induced axial motions of these components are prevented.

For moving the flexible conduit of the invention, there is provided an adjustment apparatus which provides for the installation of control devices between each two rings, directly acting on the same, for the purpose of producing the respective pivoting motions. In comparison to the conventional solutions, provided by the above mentioned DAS 1 238341, in which the rings themselves are connected to a multimembered scissors, which itself is activated by one or more positioning motors, the arrangement suggested in the present invention offers the advantage that due to the absence of intermediary members, these possible causes for mechanical failure are eliminated. This assures a particularly dependable and smooth functioning of all individual parts during a change in adjustment. Besides the solution suggested by the invention provides an opportunity to utilize the redundancy technique which is required particularly in the construction of airplanes, by providing several adjustment and control devices.

According to an additional characteristic of the invention, all adjustment motors are double acting hydraulic cylinders, whereby the adjustment motors for movement in the horizontal plane as well as those in the vertical plane are coupled by hydraulic means. This allows for the installation of a single control valve in order to regulate all cylinders which generate motion in the same plane.

An additional embodiment of the invention provides for the coupled hydraulic adjustment motors to be connected in series in such a manner that the outlet of the preceding cylinder forms the input of succeeding cylinder. The hydraulic fluid expelled by the preceding cylinder in each case provides the hydraulic pressure for the succeeding cylinder, so that due to the incompressibility of the fluid a uniform functioning of all hydraulic cylinders can be achieved.

One embodiment of the invention is illustrated in the drawings, detailed descriptions of which follow. There is shown in FIG. 1: a sideview of a conduit made of seven rings in extended position;

FIG. 2: a conduit according to FIG. 1, in a downward position;

FIG. 3: a view of the conduit, according to FIG. 1, as seen from the jet side;

FIG. 4: a lengthwise cut through a portion of the conduit according to FIG. 1;

FIG. 5: a hydraulic valving plan for the operating devices of the conduit.

FIG. 1 shows in general a piece of conduit which consists of seven successively arranged base rings 1, an outer skin 2 being connected to the rings, and inside of that an inner lining 3 which in FIG. 1 is indicated only with dotted lines. The first ring shown in FIG. 1 to the extreme left is rigidly attached to the discharge nozzle 4 of a jet engine (not illustrated). The second ring is connected to this first ring by means of the joints 5, in such a manner, that it can pivot laterally about a vertical axis, that is, in a horizontally pivoting motion. The second ring supports by joint 6 the third ring which can be pivoted about a horizontal axis, that is in a vertically pivoting motion.

The motion of the second ring with respect to the first one is effected by the hydraulic cylinder 7, the cylinder casing of which is connected to the first ring and the piston rod of which is attached to the second ring. In like manner, a hydraulic cylinder 8 is provided to effect movement of the third ring with respect to the second, etc.

FIG. 2 shows the pipe in a downward position. The total pivot angle $\alpha$ is composed of the individual angles about which the vertically pivotable rings are pivoted with respect to the directly preceding ring. In FIG. 2, the third ring is pivoted with respect to the second ring, the fifth with respect to the fourth, and the seventh with respect to the sixth, 10° in each case, resulting in a total pivoting angle of 30°. For this purpose, only the hydraulic cylinders 8 were activated, while the hydraulic cylinders 7 remained in zero position. The pieces of outer skin 2 arranged between these rings, as well as the inner lining, which is not shown, smooth out the joints and through their normal elasticity provide for a smooth continuity.

FIG. 3 shows a piece of conduit according to FIG. 1 in a view as seen from the jet stream pipe. To be seen are the joints 5 between the first and the second rings, as well as the hydraulic cylinder 7 which are necessary for the operation of the second ring, also the joints 6 and respective hydraulic cylinder 8.

FIG. 4 shows the construction of the outer skin 2, the inner lining 3, and their respective attachments to the rings 1. In the illustrated embodiment, the outer skin consists of individual sections which are arranged respectively between the base rings 1. The outer skin sections are in this fashion attached to the rings, for example by means of rivets, in a gas-tight manner. By this arrangement it is unnecessary to attach the skin to the outside diameter of the ring, which latter would result in an increased total diameter of the pipe. The inner lining consists of a spiral hose which is made of a special heat-resistant material. Because of its own respective properties of stiffness and elasticity, it assumes a smooth continuity from the straight piece of hose to the curved piece of hose, and thereby minimizes obstructions to smooth flow. The space remaining between outer skin and inner lining may be used for the conducting of cooling air, so that the outer skin, as well as the apparatus on the outside of the skin can be effectively protected from heat damage.

FIG. 5 shows as an example the construction of the hydraulic control device for one of the two adjustment motions. The three paired, successively arranged hydraulic cylinder 8, the cylinder casings of which in each case are attached to a base ring, contain in each case a dually acting hydraulic piston 10, the piston rod of which is attached to the succeeding ring (see FIG. 1 and 2). If a given piece of pipe is to be bent downward, the pistons 10 are moved to the right. A pump 11 supplies hydraulic fluid to the service valve 12 which directs it to the desired side of the piston 10. In the illustrated example, the pistons are to be moved to the right, so that the hydraulic fluid is conducted through the tubing 13 to the left chamber of the first pair of cylinders. These then, while in motion, expel the hydraulic fluid contained in the right chambers, and conduct it through the tubing 14 to the left chambers of the second pair of cylinders. In like manner, the left chambers of the third pair of cylinders are activated by the hydraulic fluid being expelled by the second pair of cylinders. The tubing 16 serves to vent air and to adjust for leakage. Because of the incompressibility of the hydraulic fluid, the system functions without yielding or delay. In this manner, with simple means, for example with the aid of only one control valve 12, a uniform functioning of the entire system is made possible, as desired and intended.

The embodiments of the invention in which an exclusive property or privilege is claimed are defined as follows:

1. A flexible conduit for the conducting of a gaseous medium, comprising:
   a plurality of axially spaced base rings arranged in series so that said gaseous medium is transmitted through the central portion of said base rings parallel to the longitudinal axes of said base rings;
   first hinge means for connecting a first pair of mutually adjacent base rings and defining a fixed first hinge axis, said first hinge axis being located in the axial spacing between said first pair of base rings and in a plane perpendicular to the axis of one of said first pair of mutually adjacent base rings; and
   second hinge means for connecting a second pair of mutually adjacent base rings and defining a fixed second hinge axis, said second hinge axis being located in the axial spacing between said second pair of base rings and in a plane perpendicular to the axis of one of said second pair of mutually adjacent base rings.

2. A flexible conduit according to claim 1, wherein said first and second hinge means includes first and second coupling means, respectively, each being adapted to couple a base ring to a mutually adjacent base ring, said first coupling means including means defining said first hinge axis thereon and said second coupling means including means defining said second hinge axis thereon, said second hinge axis being spaced 90° from said first hinge axis.

3. A flexible conduit according to claim 2, wherein said first hinge axis intersects said longitudinal axes of said first pair of base rings and wherein said second hinge axis intersects said longitudinal axes of said second pair of base rings.

4. A flexible conduit according to claim 1, including means defining an inner lining and further including means defining an outer skin.

5. A flexible conduit according to claim 4, wherein said outer skin means comprises individual skin sections secured to and arranged between said base rings.

6. A flexible conduit according to claim 1, including first drive means for effecting a relative pivoting of said first pair of base rings about said first hinge axis;
   second drive means for effecting a relative pivoting of said second pair of base rings about said second pivot axis; and control means for selectively controlling said first and second drive means.

7. A flexible conduit according to claim 6, wherein said first and second drive means are each located in said axial spacing between said first and second pair of mutually adjacent base rings, respectively.

8. A flexible conduit according to claim 6, wherein said first and second drive means are dually acting hydraulic cylinders, one end of each of said cylinders being connected to one base ring and the opposite end thereof being connected to the next adjacent base ring.

9. A flexible conduit according to claim 8, wherein said control means comprises conduit means coupled to each of said first and second drive means and is adapted to cause a uniform pivoting of each ring about a respective one of said first and second hinge axes.

10. A flexible conduit according to claim 9, wherein each of said first drive means between differing first pairs of said base rings are connected in series so that the output from one first drive means defines the input for the next first drive means.

11. A flexible conduit according to claim 10, including air vent and leakage control means between each of said series connected said first drive means and said second drive means.

12. A flexible conduit for the conducting of a gaseous medium, comprising:

a plurality of axially spaced base rings arranged in series so that said gaseous medium is transmitted through the central portion of said base rings parallel to the longitudinal axes of said base rings;

first hinge means defining a first hinge axis for pivotally connecting a first pair of mutually adjacent base rings;

second hinge means defining a second hinge axis for pivotally connecting a second pair of mutually adjacent rings, said second hinge axis being spaced axially along said series of base rings and positioned transversely to said series of base rings and positioned transversely to said first hinge axis; and securement means for securing said plurality of said base rings to a relatively fixed casing structure, said securement means being adapted to prevent a rotation of said base rings about the longitudinal axes thereof.

13. A flexible conduit according to claim 12, wherein said casing structure defines the jet exhaust nozzle of a jet propelled aircraft and said pivoting of said base rings effects a control of the vectoring of said aircraft.

* * * * *